United States Patent [19]

Kirchweger

[11] 4,340,014
[45] Jul. 20, 1982

[54] VENTILATION BLOWER FOR A NOISE-SUPPRESSING ENCAPSULATED INTERNAL COMBUSTION ENGINE

[75] Inventor: Karl Kirchweger, Graz, Austria

[73] Assignee: Hans List, Graz, Austria

[21] Appl. No.: 247,746

[22] Filed: Mar. 26, 1981

[30] Foreign Application Priority Data

Apr. 18, 1980 [AT] Austria .................................. 2115/80

[51] Int. Cl.³ .................................................. F01P 7/02
[52] U.S. Cl. ..................................... 123/41.63; 416/60
[58] Field of Search ............... 123/41.63, 41.65, 41.66, 123/41.4 E; 416/60, 134 R, 179; 415/197

[56] References Cited

U.S. PATENT DOCUMENTS

| | | | |
|---|---|---|---|
| 2,276,404 | 3/1942 | Lundquist | 416/179 |
| 2,320,663 | 6/1943 | Schultz | 416/179 |
| 3,988,948 | 11/1976 | Thien et al. | 416/60 |
| 4,188,924 | 2/1980 | Kirchweger et al. | 123/41.65 |
| 4,193,740 | 3/1980 | Charles | 416/134 R |

*Primary Examiner*—William A. Cuchlinski, Jr.
*Attorney, Agent, or Firm*—Watson, Cole, Grindle & Watson

[57] ABSTRACT

An internal combustion engine with a noise-suppressing encapsulation has a drive wheel for auxiliary units which is driven by the crankshaft of the engine and arranged outside the encapsulation. The drive wheel consists of two concentric parts which are connected via at least one elastic member. The inner part of the drive wheel has cooling air ducts which extend from inlet ends on the side opposite an opening in the encapsulation wall to a exit ends on the side adjacent the opening, the exit ends being spaced a greater distance from the axis of rotation than the inlet ends, although still lying within the noted opening. Thus a blower is provided in the form of a centrifugal pump. A cover is connected to the outer part of the drive wheel which covers the inner part and has sound-isolated suction openings for the cooling air.

5 Claims, 2 Drawing Figures

VENTILATION BLOWER FOR A NOISE-SUPPRESSING ENCAPSULATED INTERNAL COMBUSTION ENGINE

BACKGROUND OF THE INVENTION

The present invention relates to an internal combustion engine which has a noise-suppressing encapsulation and a blower for ventilation of the encapsulation, and which also has a drive wheel for driving auxiliary units, the drive wheel being connected to the blower and driven by the crankshaft of the engine.

DESCRIPTION OF THE PRIOR ART

An engine of the kind mentioned above is shown in Austrian Pat. No. 335,801. This engine includes a V-belt pulley on one end of the crankshaft which functions to drive several auxiliary units, e.g., a generator, and to which a blower is connected on the front side thereof opposite the engine. During the operation of the engine, cooling air is supplied by the blower through a suction opening in the noise-suppressing encapsulation. The suction opening is arranged in the area of the blower and noise emission from the suction opening is prevented by a laminated cover provided on the outside of the encapsulation. However, by this cover part, which has to be additionally arranged on the encapsulation, the overall dimensions of the encapsulated engine are increased and the manufacture and assembly of the encapsulation are complicated.

Furthermore, Austrian Pat. No. 341,832 shows an internal combustion engine which, with regard to the cooling air supply for the encapsulation, is designed similarly to the aforementioned engine. The difference with respect to the cooling air supply of the aforementioned engine resides in the way the noise emission from the suction opening in the encapsulation is suppressed. For this purpose an absorption silencer is provided which is arranged adjacent to the suction opening on the outside of the encapsulation. Although a better noise suppression is achieved by this silencer, the cost for the design and construction is also increased.

It is an object of the present invention to improve on an internal combustion engine of the kind mentioned above in such a way that the mentioned disadvantages of the known embodiments are prevented, e.g., wherein an internal combustion engine is provided wherein the noise suppression of the suction opening for the cooling air is obtained while no substantial increase in the overall dimensions of the noise-supressing encapsulation of the engine is entailed.

SUMMARY OF THE INVENTION

According to the present invention this can achieved in an internal combustion engine which has a noise-suppressing encapsulation and a blower for ventilation of the encapsulation, and which includes a drive wheel for driving auxiliary units, if the drive wheel consists of two concentric parts, the outer part thereof being connected via at least one elastic member to the inner part thereof the inner part being connected to an end of the crankshaft. The drive wheel is arranged outside of the encapsulation so as to cover an opening in an encapsulation wall for the crankshaft, and the drive wheel includes cooling air ducts arranged in the inner part thereof. Each one of the cooling air ducts is so arranged as to extend from an inlet end on the side opposite the opening in the encapsulation to a exit end on the side adjacent the opening, and the exit end of each cooling air duct is spaced a greater distance from the axis of the crankshaft than the inlet end, although still lying within the opening. A cover is arranged on the side of the drive wheel opposite the opening in the encapsulation, the cover being connected to the outer part of the drive wheel and covering the inner part thereof, and includes sound-isolated suction openings. By means of the elastic member the outer part of the drive wheel is largely vibration-isolated from the inner part thereof, which is fixed to the crankshaft, and thus, the drive wheel for driving auxiliary units of the engine acts as a torsional-vibration balancer. Due to the arrangement of the drive wheel outside of the noise-suppressing encapsulation, it is possible to bring the encapsulation walls nearer to the surface of the engine, whereby the noise-suppression is improved and its overall dimensions are reduced. By providing the inner part of the drive wheel with ducts extending to the side covering the opening for the crankshaft in the encapsulation, these ducts having a greater spacing from the crankshaft axis at their exit ends than at their inlet ends a simple blower is obtained, which usually is sufficient for achieving the cooling air requirement of the inside of the noise-suppressing encapsulation. The inner part of the drive wheel, which is drivingly connected to the end of the crankshaft and represents a noise emitter protruding from the noise-suppressing encapsulation, is covered along its circumference by the outer part of the drive wheel, which is connected thereto via the elastic member, and thus is already isolated against body sound transmission, and is further covered at its front side opposite the opening for the crankshaft by a cover fixed to the outer part of the drive wheel, which includes sound isolated suction openings, or suction canals, respectively, for supplying cooling air to the suction side of the blower formed by the inner part of the drive wheel. Thus an extremely compact construction of the blower for ventilation of the inside space of the encapsulation together with the torsional-vibration balancer formed by the drive wheel results, and a space saving arrangement of the sound isolation elements on the suction side of the blower is possible.

According to a further development of this invention the inner part of the drive wheel is designed as a centrifugal pump having bent ducts. Thus the efficiency of the blower is increased without increasing the overall dimensions of the drive wheel.

The inner part of the drive wheel can, according to another feature of this invention, have a concentric recess and at least a part of that part of the cover for the inner part which shows the suction openings can be arranged within this recess. Thanks to the concentric recess in the inner part of the drive wheel, it is possible to arrange the cover with the suction openings at least partially within the drive wheel, whereby the unit consisting of the blower, or the torsional-vibration balancer and the drive wheel, becomes still more compact.

It is especially advantageous if that part of the cover which has the suction openings is designed as a centrifugal pump having bent ducts, too. By this embodiment a two-step blower is provided in a very simple way, and the efficiency, meaning the possible delivery efficiency, of the blower is increased and the sound isolation is significantly improved as the suction canals do not extend straight-lined to the outside.

It is further advantageous if at least that part of the cover which has the suction openings is made of sound-isolating plastic material. Thus the noise suppression of the cover of the blower is increased and the effectiveness of the suction openings, or suction canals, respectively, which act as absorption silencers, is improved.

DESCRIPTION OF THE DRAWINGS

The present invention is hereinafter more specifically described with reference to an exemplary embodiment depicted in the accompanying drawings, wherein.

DESCRIPTION OF THE PREFERRED EMBODIMENT

Figure 1:
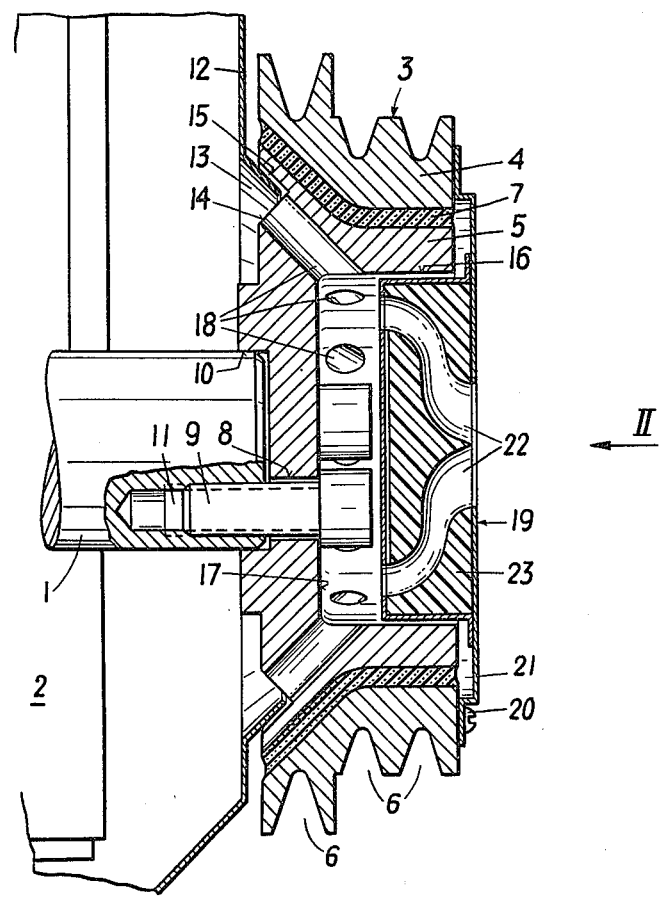
FIG. 1 shows a partial sectional view of an internal combustion engine according to this invention.

To one end of a crankshaft 1 of a noise-suppressing encapsulated internal combustion engine 2 is connected a drive wheel, constructed as a V-belt pulley for driving auxiliary units (not shown) of the engine. This V-belt pulley 3 includes two concentric parts, an outer part 4, which includes splines 6, an inner part 5, and an elastic member 7 which connects the outer part 4 to the inner part 5. The elastic member 7 constructed as a one piece intermediate layer which consists, e.g., of a vulcanized rubber-like material. The inner part 5 of the V-belt pulley 3 has three through bores 8 in the region of the end of the crankshaft 1 for fixing bolts 9, by means of which the inner part is fixed to corresponding threaded bores 11 in the end of the crankshaft. The inner part 5 is centered with respect to the crankshaft 1 by a recess 10, which recess has a diameter corresponding to that of the end of the crankshaft 1. Thereby, the entire V-belt pulley 3, or the torsional-vibration dampener constructed of the inner part 5, the elastic member 7 and the outer part 4, respectively, is drivingly connected to the crankshaft 1.

The V-belt pulley 3 is arranged outside the noise-suppressing encapsulation 12 and covers an opening 13 in the encapsulation wall. The rim of the opening 13 is bent to the outside and engages with a recess 14 in the inner part 5 of the V-belt pulley 3. A gap 15 is created between the inner part 5 and the encapsulation 12 or the opening 13, respectively, which is designed to be sufficiently wide to, on the one hand, enable an unimpaired rotation of the V-belt pulley 3 and, on the other hand, largely prevent the emission of sound and cooling air. The inner part 5 of the V-belt pulley 3 includes on the side opposite the opening 13 a concentric recess 16, which in the depicted embodiment has a depth of approximately two thirds of the width of the V-belt pulley. Canals 18 are provided in the inner part 5 which extend from the inner surface of the recess 16 near the bottom 17 obliquely to the recess 14 on that side of the inner part 5 which covers the opening 13.

Figure 2:
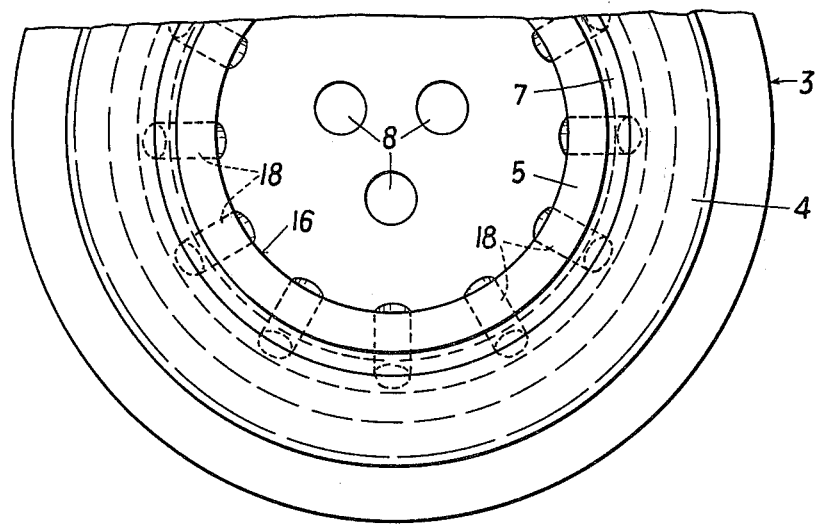
FIG. 2 shows a partial view of the drive wheel of FIG. 1, seen in the direction of arrow II in FIG. 1.

As can be seen from FIG. 2, the canals 18 are arranged at regular angular spacings and act, because of the fact that their exit ends at the recess 14 lie, with regard to the axis 19 of the crankshaft and of the V-belt pulley, at a greater distance than their inlet ends in the recess 16, as a centrifugal pump, thus supplying air from the inside of the recess 16 via the canals 18 and the opening 13 into the inside of the encapsulation 12 when the V-belt pulley 3 is rotating.

The inner part 5 of the V-belt pulley 3, which is fixed to the crankshaft 1 and arranged outside the encapsulation 12-thus representing a protruding noise emitter-is covered along its circumference by the elastic member 7 and the adjacent outer part 4 to help prevent noise emission. As a sound isolation for the front side of the inner part 5 as well as for the canals 18, which are in direct communication with the inside of the encapsulation 12, a cover 9 is fastened by means of bolts 20 on the outer part 4, which is already isolated against body sound transmission via the elastic member 7. The cover 19 comprises in the depicted embodiment a cover plate 21 to which a part 23 is connected. The part 23 of the cover 19 is provided with suction openings, or suction canals 22, respectively, and is also constructed in the form of a centrifugal pump. As far as it is allowed by the fixing bolts 9 of the V-belt pulley 3, the part 23 is arranged within the concentric recess 16. Even without a special design or arrangement of the suction openings or suction canals, respectively, an advantageous increase of the delivery of the blower is possible due to the cover which acts as a second blower step. At least the part 23 of the cover 19 is made of sound-isolating plastic material, e.g., with performed canals, whereby together with the bent character of the canals 22, a very good sound isolation of the inner part 5 of the V-belt pulley 3 and the canals 18 is obtained. Instead of the bent canals, it would be equally possible to provide, e.g., simple suction openings, whereat care has to be taken just only with regard to a sufficient sound isolation. The canals 18 in the inner part 5 of the V-belt pulley 3, which in the depicted embodiment are formed of cylindrical bores, could be constructed, without any effect on the present invention, e.g., similarly to the way the rotor of a centrifugal pump has forwardly or backwardly bent blades. In this case it is just necessary to provide for a sufficient dimensioning so that the comparatively great forces resulting from torsional-vibration can be transmitted.

I claim:

1. An internal combustion engine having a noise-suppressing encapsulation and a blower for ventilation of said encapsulation, comprising a drive wheel for driving auxiliary units, said drive wheel being connected to said blower, driven by the crankshaft of the engine, and consisting of two concentric parts, an outer part of said concentric parts being connected via at least one elastic member to an inner part of said concentric parts and said inner part being connected to one end of said crankshaft, said drive wheel further being arranged outside of said encapsulation, covering an opening for said crankshaft in an encapsulation wall, and having cooling air ducts arranged in said inner part thereof, each one of said cooling air ducts being so arranged as to run from an inlet end on the side opposite said opening to a exit end on the side adjacent said opening, said exit end having a greater spacing from the axis of said crankshaft than said inlet end although still lying within said opening, and wherein a cover is arranged on the side opposite said opening, connected to said outer part and covering said inner part, said cover having sound-isolated suction openings.

2. An internal combustion engine according to claim 1, wherein said inner part is designed as a centrifugal pump having bent ducts.

3. An internal combustion engine according to claim 1 or 2, wherein said inner part has a concentric recess and at least a part of that part of said cover having said suction openings is arranged within said recess.

4. An internal combustion engine according to claim 1 or 2, wherein said part of said cover showing said suction openings is designed as a centrifugal pump having bent ducts.

5. An internal combustion engine according to claim 1 wherein at least said part of said cover having said suction openings is made of a sound-isolating plastic material.

* * * * *